March 31, 1925.
S. B. STEECE
AUTOMATIC GATE
Filed Aug. 22, 1924
1,531,995
2 Sheets-Sheet 1
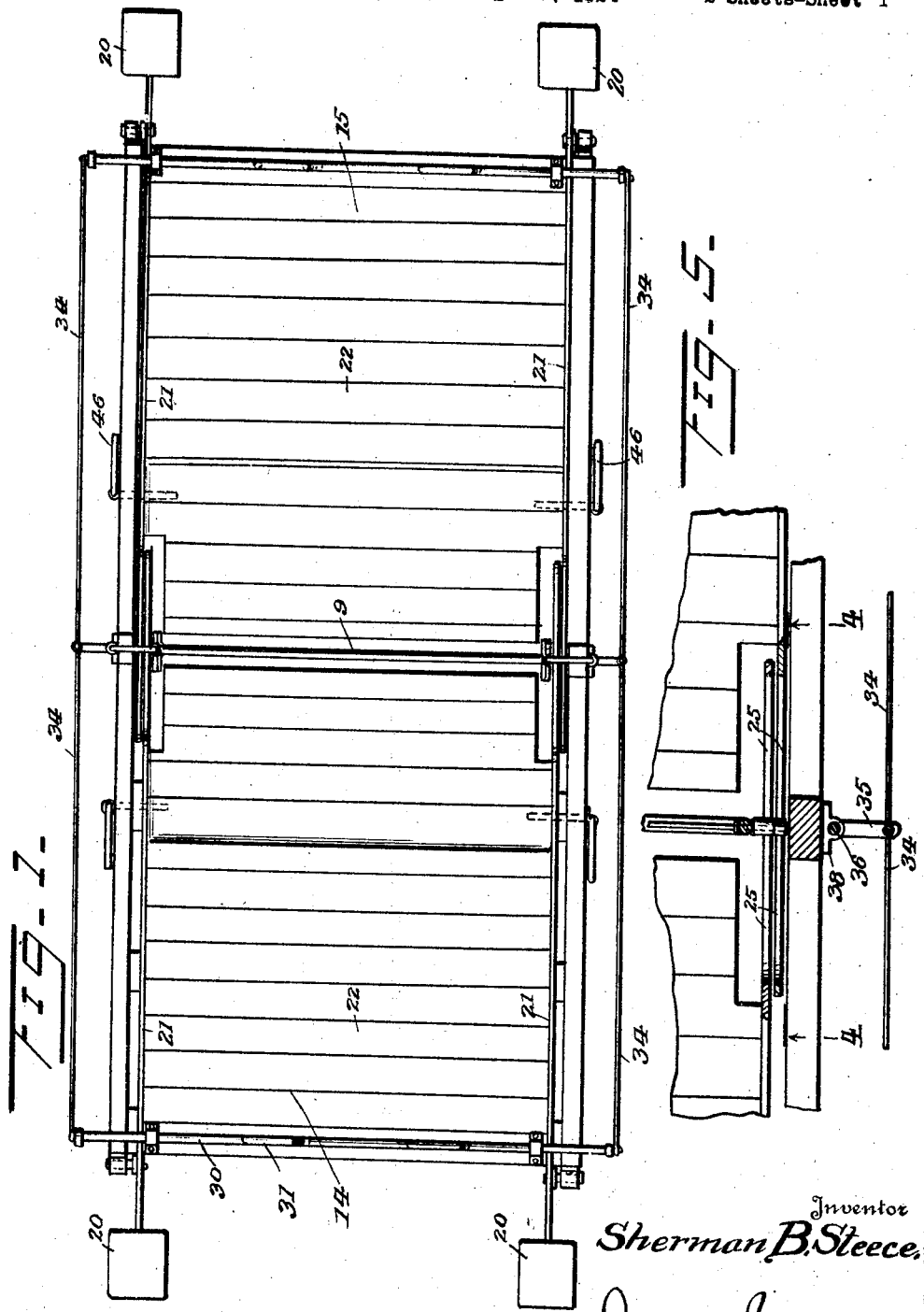
Inventor
Sherman B. Steece,
By
Attorneys

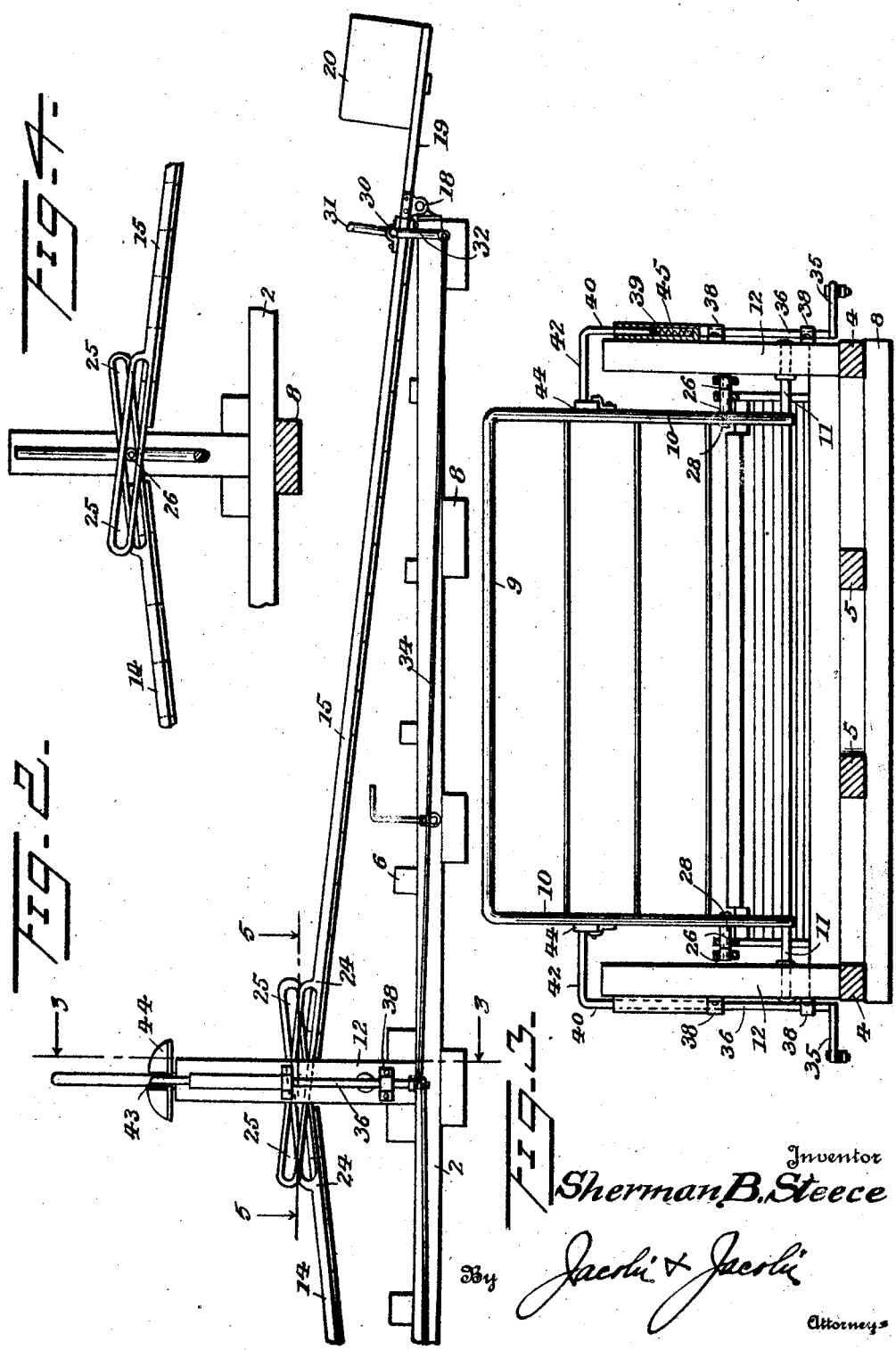

Patented Mar. 31, 1925.

1,531,995

UNITED STATES PATENT OFFICE.

SHERMAN B. STEECE, OF AITKIN, MINNESOTA.

AUTOMATIC GATE.

Application filed August 22, 1924. Serial No. 733,515.

*To all whom it may concern:*

Be it known that SHERMAN B. STEECE, a citizen of the United States, residing at Aitkin, in the county of Aitkin and State of Minnesota, has invented certain new and useful Improvements in Automatic Gates, of which the following is a specification.

This invention relates to automatic gates and particularly to farm gates which are capable of being automatically opened through the weight of the vehicle passing therethrough.

Among the features of the present invention may be mentioned that of the provision of means operated by the vehicle as it moves onto the operating mechanism of rocking the gate off center, while the subsequent movement of the vehicle onto said operating mechanism causes the gate to be moved to full open position.

Another feature resides in the arrangement whereby the gate and operating mechanism are returned to initial position automatically after the vehicle has moved therefrom.

Another feature resides in a construction wherein a duplex operating mechanism permits the gate to be opened no matter from which side thereof the vehicle approaches.

Many other features and advantages will be apparanet by reference to the following specification and drawings, in which latter,—

Figure 1 is a plan view of the device;

Figure 2 is a side elevation of one end thereof;

Figure 3 is a transverse section on the line 3—3 of Figure 2;

Figure 4 is a detail vertical section on line 4—4 of Figure 5; and

Figure 5 is a detail section on the line 5—5 of Figure 2.

Referring now more particularly to the accompanying drawings by numerals of reference, 2 designates a main platform which extends across the gateway of a fence, not shown, and upon which main platform are mounted the operating parts of this apparatus. This platform includes side longitudinal sills 4, intermediate sills 5, and transverse sills 6 and 8 providing a rectangular supporting framework.

A vertically swinging, rectangular and preferably metallic gate 9 is provided upon its opposite side frame members 10 adjacent their lower ends with journal rods 11, respectively pivoted in the lower portions of uprights 12 carried by the main supporting frame intermediate its ends.

For the purpose of swinging the gate on its horizontal axis, I provide, upon opposite sides thereof, and arranged over the main platform, a pair of identically constructed, operating platforms 14 and 15, a specific description of one of which will be sufficient, it being understood that the operating platforms are designed and adapted to operate independently. Each of these platforms is pivoted at its outer end as at 18 upon one end of the main platform and is provided with extension arms 19 supporting counterbalances 20, the weight of which is sufficient to normally maintain the operating platform elevated above the main platform in an inwardly and upwardly inclined plane.

The operating platforms 14 and 15 include side, preferably metallic frame members 21 which support transverse planks 22, the latter being suitably spaced apart toward the inner ends of said operating platforms to accommodate the longitudinal and transverse members of the gate when it is swung into parallelism therewith so that an unobstructed plane surface is presented for the travel of the wheels of the vehicle passing thereover, as will be understood upon further reference to the description.

The inner ends of the side members 21 of the operating platforms are provided with extensions 24 formed with elongated openings, yokes, or slots 25, through which pass and in which operate bearing rollers 26 journaled on stub shafts 28 extending laterally from the lower portions of the side members 10 of the gate. For the purpose of releasing the gate and imparting thereto an initial swinging movement to bring it to one side or the other of dead center, I provide the following mechanism which includes a rock shaft 30 journaled on and transversely of the outer or approaching end of each of the operating platforms 14 and 15, said rock shafts each having a pair of upstanding yokes 31, intermediate its ends above the platform and upon its outer ends, diametrically opposed crank arms 32, which through longitudinal pitmen rods 34 are connected with crank arms 35 extending at right angles from the lower ends of vertical rock shafts 36 journaled respectively in brackets 38 upon the opposite uprights 12. The upper end of each rock shaft 36 is formed with a sleeve 39 within which is telescopically received, the lower end of a rod 40 formed at its upper extremity with a lateral and inwardly extending arm 42, the terminal of which normally lies in the crotch 43 of a keeper 44 arranged upon each side of the gate. Return of the gate to a vertical position necessitates a slight longitudinal movement of the rod 40 with respect to the rod 36, although these rods are keyed or splined for unitary oscillating motion, and to this end I provide within the sleeve 39, a tension coil spring 45 connecting the rods 40 and 42.

At times it is desired that the gate 9 be maintained in an open position, without operation by the operating platforms, and when such is the case, said operating platforms are depressed so that they be substantially parallel with the main supporting platform and in this position are held by swinging hooks 46.

While the operation of this invention should be clearly understood from the foregoing, a brief outline thereof might be noted:—Assuming the gate is in vertical position and the operating elements in the position shown in Figure 2, a vehicle approaching, rolls onto the operating platform, the wheels first engaging the upstanding yokes 31, and moving them forwardly, this operation, through the crank arms 32 and 35 and pitmen rods 34 serving to initially move the gate to one side or the other of the center depending upon the side from which the vehicle has approached. Subsequent movement of the vehicle onto one of the operating platforms 14 and 15 depresses it, overbalancing the weights 20 and through the cam action of the slot and roller connection 25 and 26, rocks the gate to a position parallel with the said operating platform. As the vehicle passes off the platform, the counterbalancing weights 20 bring the operating platforms back to their normal inclined position, the reverse action of the slot and roller connection returning the gate to vertical position, while the arm 42 snaps back into the crotch 43 of the keeper 44.

From the foregoing description of the construction of my improved device, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention, what I claim is:

A gate operating mechanism comprising a main platform, operating platforms arranged over said main platform and pivoted respectively at the opposite ends of the latter, means for normally supporting said operating platforms at an inclined plane above said main platform, a vertically swinging gate pivoted at its lower portion transversely of said main platform intermediate its ends, means mounted upon the approach ends of said operating platforms for initially moving said gate to one side or the other of its center of movement and a pin and slot connection between each of said operating platforms and said gate whereby depression by the weight of a vehicle on said operating platforms will cause said platforms and gate to move into parallel relation.

In testimony whereof I affix my signature.

SHERMAN B. STEECE.